(12) United States Patent
Kamoshida et al.

(10) Patent No.: US 6,803,974 B2
(45) Date of Patent: Oct. 12, 2004

(54) LIQUID CRYSTAL DISPLAY DEVICE

(75) Inventors: Kenta Kamoshida, Mobara (JP); Masahiro Ishii, Mobara (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 09/933,675

(22) Filed: Aug. 22, 2001

(65) Prior Publication Data

US 2002/0033905 A1 Mar. 21, 2002

(30) Foreign Application Priority Data

Sep. 20, 2000 (JP) ........................................ 2000-285278

(51) Int. Cl.[7] ........................ G02F 1/136; G02F 1/1343; G02F 1/1333
(52) U.S. Cl. ........................ 349/42; 349/141; 349/122
(58) Field of Search ........................ 349/42, 141, 122

(56) References Cited

U.S. PATENT DOCUMENTS

| | | |
|---|---|---|
| 5,287,208 A | 2/1994 | Shimoto et al. |
| 5,784,133 A | 7/1998 | Kim et al. |
| 5,790,220 A | 8/1998 | Sakamoto et al. |
| 6,049,369 A | 4/2000 | Yanagawa et al. |
| 6,208,399 B1 | 3/2001 | Ohta et al. |
| 6,300,926 B1 | 10/2001 | Yoneya et al. |
| 6,310,676 B1 * | 10/2001 | Aratani et al. ............... 349/141 |
| 6,356,331 B1 * | 3/2002 | Ono et al. .................. 349/141 |
| 6,531,713 B1 * | 3/2003 | Yamazaki ..................... 257/59 |

FOREIGN PATENT DOCUMENTS

| | | |
|---|---|---|
| JP | 11-295763 | 1/1999 |
| KR | 1999-0083510 | 4/1999 |

OTHER PUBLICATIONS

Office action from Korean Patent Office dated Oct. 27, 2003.

* cited by examiner

Primary Examiner—John F. Niebling
Assistant Examiner—Jennifer M. Kennedy
(74) Attorney, Agent, or Firm—Reed Smith LLP; Stanley P. Fisher, Esq.; Juan Carlos A. Marquez, Esq.

(57) ABSTRACT

Generation of stain-like display defects is prevented. There are provided in a liquid crystal-side pixel region of one substrate of respective substrates that are disposed to oppose each other with liquid crystals interposed therebetween a thin-film transistor being driven by a scan signal from a gate signal line, a pixel electrode to which an image signal from a drain signal line is supplied from this thin-film transistor, a protective film that is formed to also cover the thin-film transistor and the pixel electrode, and a resin film as formed on an upper surface of this protective film.

4 Claims, 4 Drawing Sheets

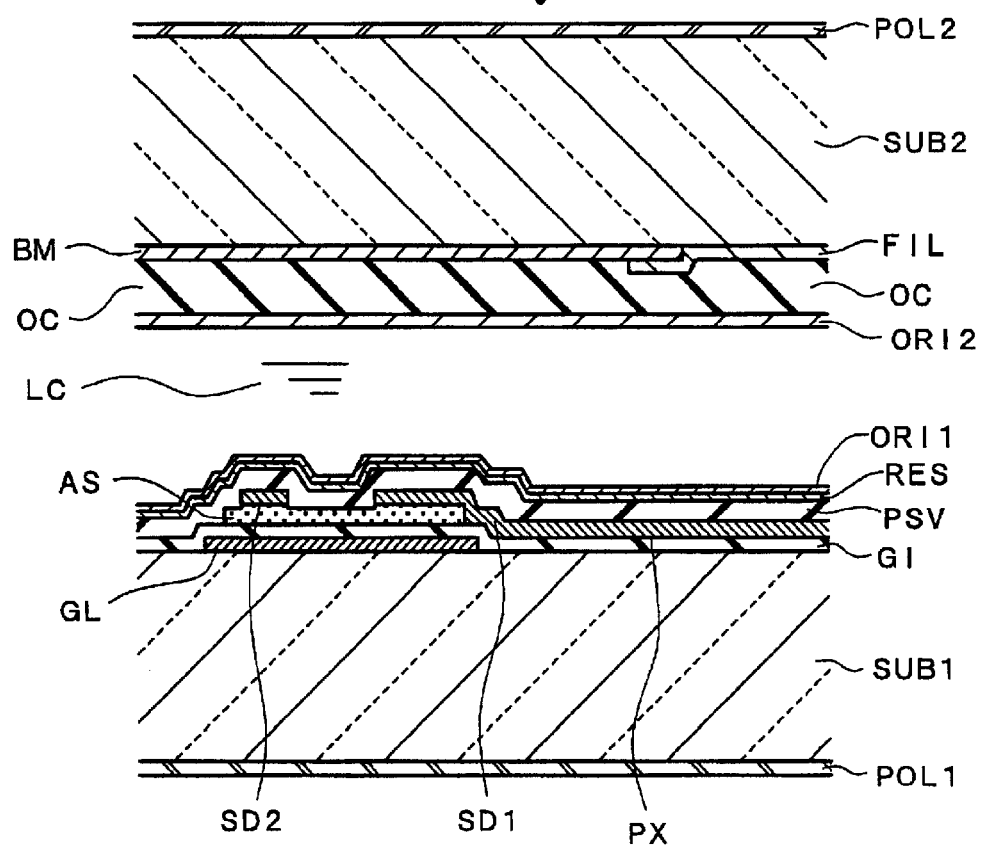
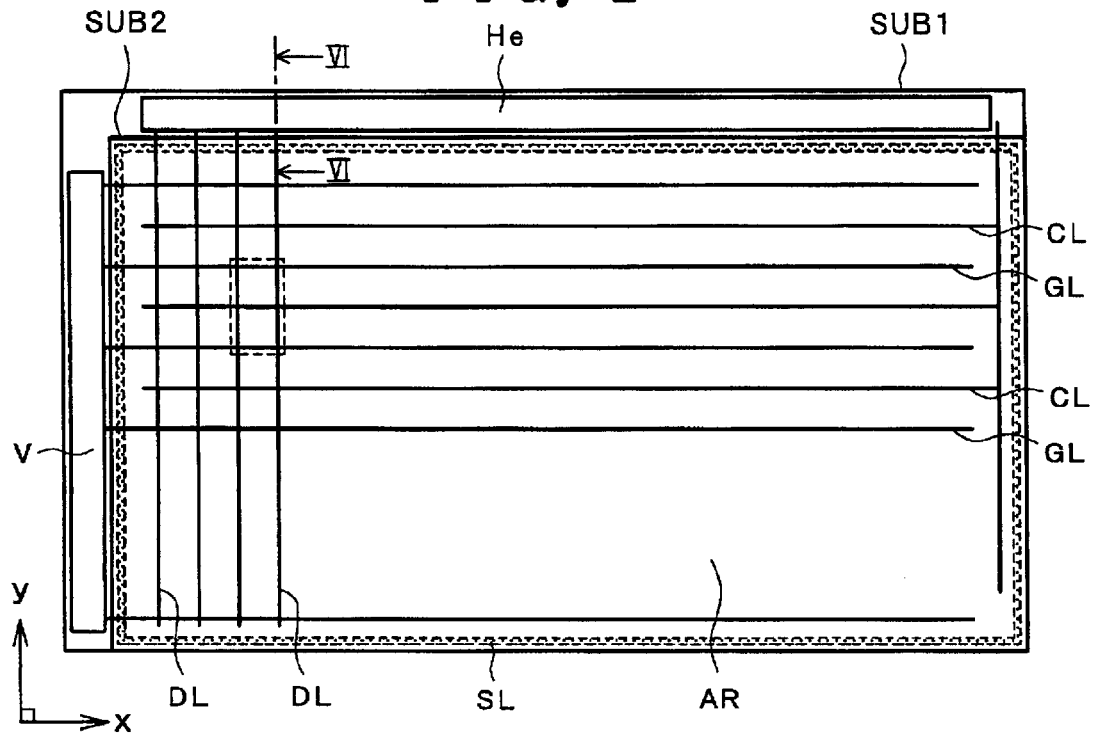

LIQUID CRYSTAL DISPLAY DEVICE

BACKGROUND OF THE INVENTION

1. Field of the Invention

The present invention relates to liquid crystal display devices and also relates for example to liquid crystal display devices of the active matrix type.

2. Background Art

An active-matrix liquid crystal display device is typically arranged so that a region surrounded by gate signal lines extending in the x direction and being parallel-provided in the y direction and drain signal lines extending in the y direction and being parallel-provided in the x direction on a liquid crystal-side surface of one transparent substrate of respective transparent substrates that are disposed to oppose each other with a layer of liquid crystal material interposed between them is for use as a pixel region, the device comprising in this pixel region a thin-film transistor as driven by supplement of a scan signal from one-side gate signal line and a pixel electrode to which an image signal from one-side drain signal line is supplied via this thin-film transistor.

And although it is arranged so that the liquid crystal's optical transmissivity is controlled by an electric field which is created between this pixel electrode and an opposite or "counter" electrode, there is known the one that the counter electrode is formed on the transparent substrate side with the pixel electrode being formed therein.

In brief, the pixel electrode and counter electrode are designed to have a comb-shaped pattern, for example, with respective ones biting each other, wherein an electric field having components extending in parallel to the transparent substrate of those electric fields created between them is used to drive liquid crystal molecules (this is called the lateral electric field scheme).

Here, the pixel electrode and counter electrode are covered by a protective film for preventing a dielectric film functioning as a gate insulation film of the thin-film transistor and the thin-film transistor from coming into direct contact with the liquid crystal; thus, they will not be brought into direct contact with the liquid crystal.

SUMMARY OF THE INVENTION

However, it has been affirmed that the liquid crystal display device thus arranged in this way suffers from risks of occurrence of stain-like display defects in its display region plane (region surface consisting of an ensemble of pixel regions), which can progress in some cases.

And, the cause of this display defect generation has been investigated to reveal the fact that holes or cracks or the like take place at a protective film or else thus causing a leak current to be derived between signal lines or the like as exposed thereby via liquid crystals leading to generation of electrochemical reaction whereby the liquid crystal's ion species density locally gets higher resulting in a likewise decrease in liquid crystal support rate.

One remedy for this is to make the protective film be formed of a thick film; however, in cases where more than one contact hole for connection between a pixel electrode and thin-film transistor is formed in such protective film, this contact hole will be formed to have a larger size, which in turn serves as a serious bar to successful achievement of the required miniaturization or downsizing.

The present invention was made based on such circumstance and its primary objective is to provide a liquid crystal display device capable of precluding generation of the above-noted stain-like display defects.

A brief summary of a representative one of the inventions as disclosed in this application for patent will be explained below.

The liquid crystal display device in accordance with the instant invention is one comprising, in a liquid crystal side pixel region of one substrate of respective substrates as disposed to oppose each other with a layer of liquid crystal material interposed therebetween, a thin-film transistor which is driven by a scan signal from a gate signal line; a pixel electrode to which an image signal from a drain signal is supplied via this thin-film transistor; a protective film formed to also cover the thin-film transistor and the pixel electrode; and a resin film formed on or over an upper surface of this protective film.

The liquid crystal display device arranged in this way comes to have an arrangement that even when scars and/or cracks occur at the protective turn, such scars and/cracks are cured by the resin film.

Owing to this, it will no longer happen that those signal lines or the like underlying the protective film are exposed to the liquid crystal side; thus, it will hardly happen that a leak current is generated through the liquid crystal resulting in a local increase in the liquid crystal's ion species density due to creation of electrochemical reaction, which in turn leads to a decrease in liquid crystal support rate.

Due to this, it becomes possible to suppress unwanted generation of stain-like display defects.

BRIEF DESCRIPTION OF THE DRAWINGS

FIG. 1 is a main-part sectional diagram showing one embodiment of the liquid crystal display device in accordance with the present invention, which is a cross-sectional view as taken along line I—I of FIG. 3;

FIG. 2 is a plan view diagram showing one embodiment of the liquid crystal display device in accordance with this invention;

DESCRIPTION OF THE PREFERRED EMBODIMENTS

Figure 3:
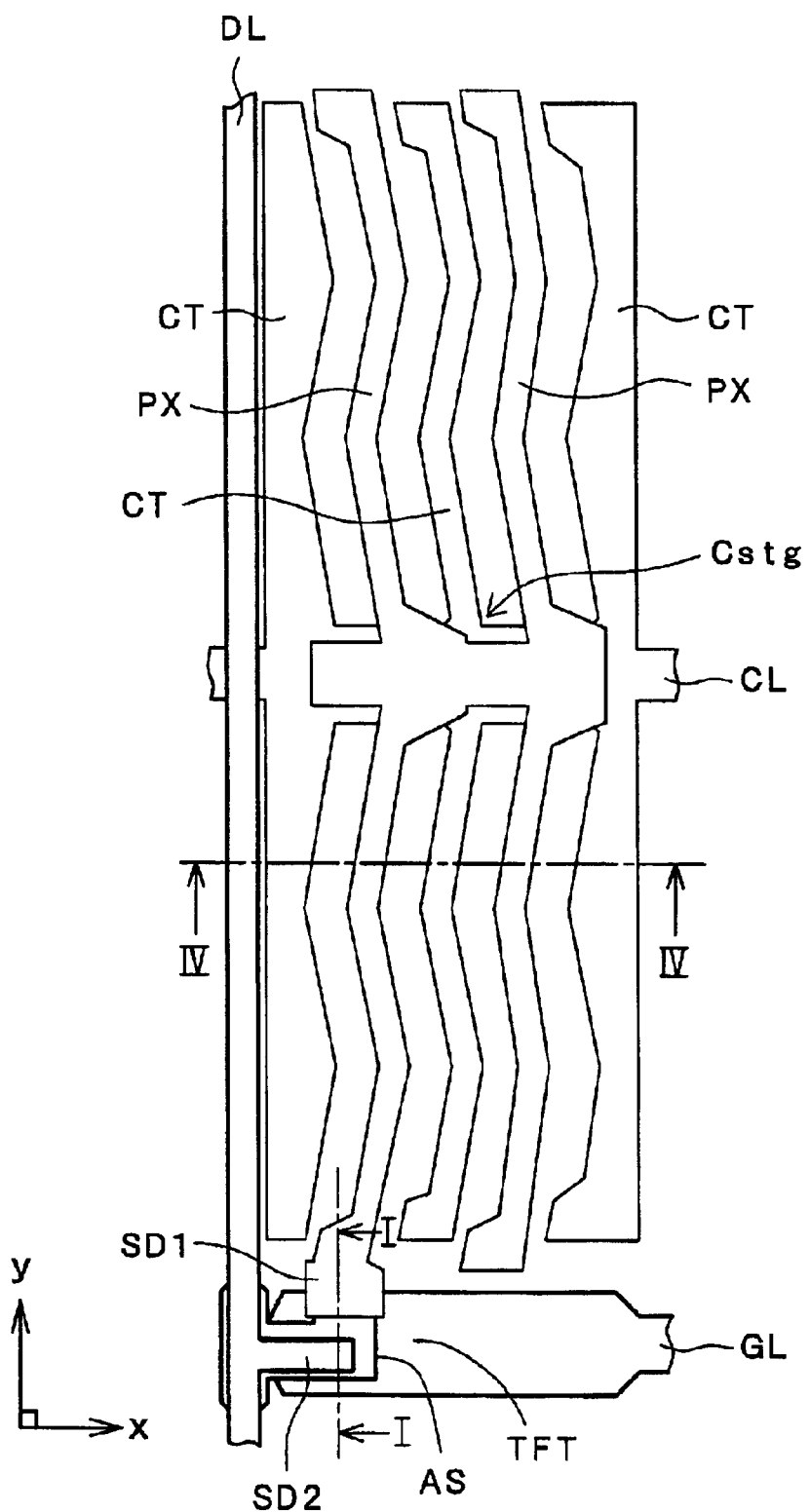
FIG. 3 is a plan view diagram showing one embodiment of a pixel of the liquid crystal display device in accordance with the invention.

More detailed means and effects of the present invention will become apparent in the following explanation.

Preferred embodiments of the liquid crystal display device in accordance with the present invention will be set forth with reference to the accompanying drawings below.

Embodiment 1

<Overall Arrangement>

FIG. 2 is a plan view diagram showing one embodiment of the liquid crystal display device in accordance with this invention. In this drawing, there is a lower transparent substrate SUB1, wherein an upper transparent substrate SUB2 is disposed over an upper surface of this transparent substrate SUB1 with a layer of liquid crystals being interposed between these substrates.

The transparent substrate SUB has its liquid crystal side surface on which gate signal lines GL extending in an x direction in the drawing and being parallel-provided in a y direction are formed, wherein scan signals are supplied from the one end side (left side in the drawing) thereto by a vertical scan circuit V respectively.

In addition drain signal lines extending in the y direction in the drawing and being parallel-provided in the x direction are formed, wherein image signals are supplied from the one end side (upper side in the drawing) thereto by an image signal drive circuit He respectively.

Counter voltage signal lines CT are formed between respective gate signal lines GL in a direction parallel to the gate signal lines GL and are commonly connected together at their one end side (right side in the drawing), to which a counter voltage signals is supplied via a terminal.

A region that is surrounded by mutually neighboring gate signal lines GL and mutually neighboring drain signal lines DL is arranged as a pixel region (region indicated by a dotted-line frame in the drawing), wherein a region consisting of an ensemble of such pixel regions is designed as a liquid crystal display section AR.

Although details of the arrangement of this pixel region will be explained later, there are formed within this pixel region a thin-film transistor TFT as driven by supplement of a scan signal from a gate signal line GL, a pixel electrode PX to which an image signal is supplied via this thin-film transistor TFT from a drain signal line DL, and an opposite or "counter" electrode CT for generation of an electric field component or components in almost parallel to the transparent substrate SUB1 between this pixel electrode PX and itself.

The transparent substrate SUB2 is disposed at certain part of the liquid crystal display section AR while avoiding mount regions of the vertical scan circuit V and image signal drive circuit He. Note here that the vertical scan circuit V and image signal drive circuit He are each comprised of a plurality of semiconductor integrated circuits.

Additionally, fixation of the transparent substrate SUB2 to the transparent substrate SUB1 is done by a seal material SL which also functions to seal liquid crystals in the liquid crystal display section AR.

<Pixel Arrangement>

Figure 4:
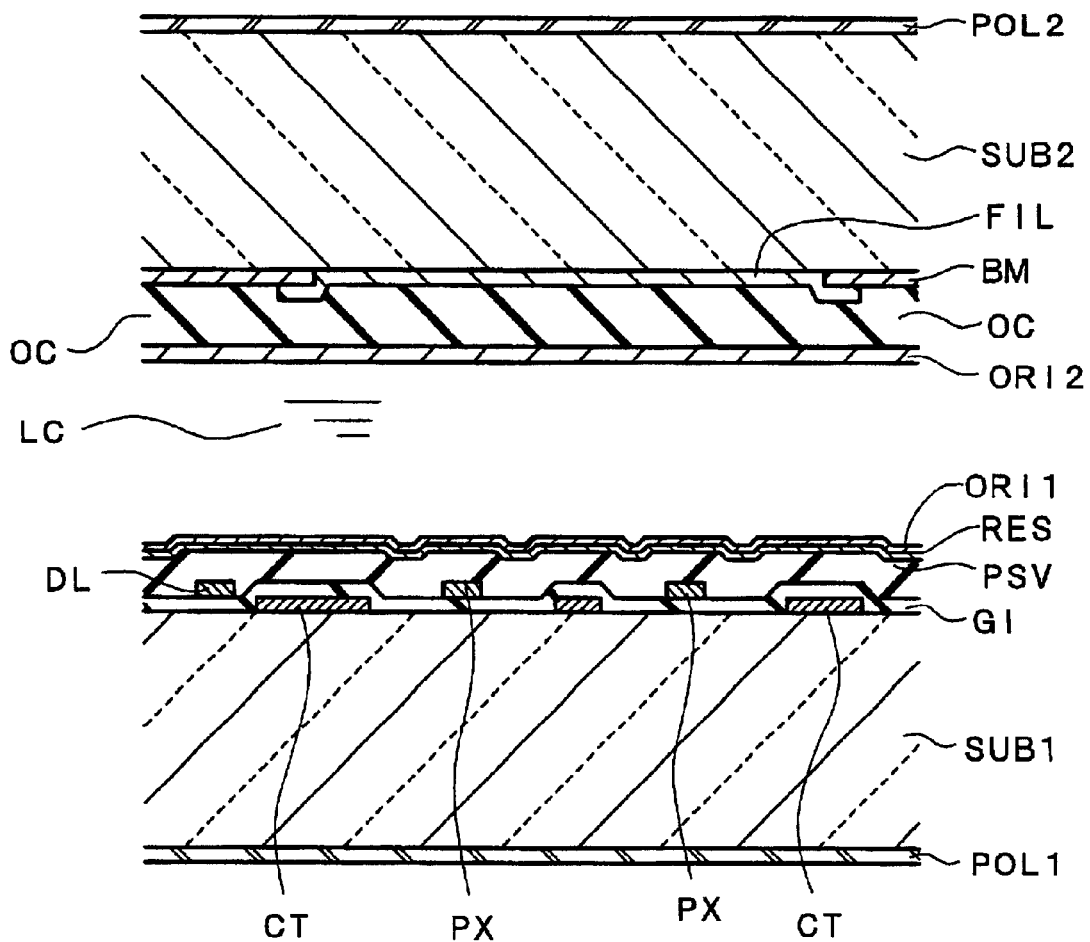
FIG. 4 is a sectional diagram taken along line VI—VI of FIG. 3.

FIG. 3 is a plan view diagram showing details of one embodiment of the pixel region (within the dot-lined frame shown in FIG. 2). In addition a cross-sectional diagram along line I—I in the drawing is shown in FIG. 1 whereas that along line IV—IV is shown in FIG. 4.

In FIG. 3 a gate signal line GL extending in the x direction in the drawing is formed on the liquid crystal side surface of the transparent substrate SUB1.

And a counter voltage signal line CL that runs in the x direction in the drawing is formed between the gate signal line GL and its neighboring gate signal line GL on the upper side thereof (not shown).

This counter voltage signal line CL is formed at the same layer as the gate signal lines GL, and its material is the same as that of the gate signal lines GL.

The counter voltage signal line CL is formed so that it is integral with a counter electrode CT which is formed within a pixel region to extend in the y direction in the drawing; in the same drawing, three counter electrodes CT are formed.

While this counter electrode CT is formed into a zigzag shape in the extending direction thereof, this arrangement will be later explained in detail in conjunction with a pixel electrode PX to be described later.

Formed on the surface of the transparent substrate SUB1 on which the gate signal lines GL and counter voltage signal lines CL (counter electrodes CT) are formed in this way is a dielectric film GI (see FIGS. 1 and 4) which is comprised for example of an SiN film that covers these signal lines also.

This dielectric film GI has a function as an interlayer dielectric film at intersections between gate signal lines GL and counter voltage signal lines CL with respect to drain signal lines DL as will be described later, a function as a gate insulation film with respect to a thin-film transistor TFT to be later described, and a function as a dielectric film with respect to a capacitive element Cstg to be later described.

A semiconductor layer AS is formed on a surface of this dielectric film GI at lower left part of the pixel region in such a manner that it partly overlaps the gate signal lines GL.

This semiconductor layer AS is the one that functions as that of the thin-film transistor TFT and is made of amorphous silicon (a-S1) by way of example.

Although an inverse stagger structured MIS type transistor with part of a gate signal line GL being as its gate electrode is formed by fabrication of a drain electrode SD2 and source electrode SD1 on an upper surface of this semiconductor layer AS, the drain electrode SD2 and source electrode SD1 are formed simultaneously during formation of the drain signal lines DL and pixel electrodes PX, respectively.

To be brief, the drain signal line DL extending in the y direction in the drawing is formed over the dielectric film GI, part of which is extended up to a location over the semiconductor layer AS, thereby causing its extension portion to serve as the drain electrode SD2.

In addition, two pixel electrodes PX that are formed to extend in the y direction in the drawing between the counter electrodes CT, wherein these respective pixel electrodes PX are commonly connected together over the counter voltage signal lines CL while simultaneously permitting one end of a pixel electrode PX adjacent to the semiconductor layer AS to extend up to part overlying the semiconductor layer AS to thereby let its extension portion be arranged as the source electrode SD1.

Here, the pixel electrodes PX each have a zigzag shape along the extending direction thereof in a similar manner to that of the counter electrodes CT.

More specifically the pixel electrodes PX and counter electrodes CT are disposed in parallel to each other while having curved or bent portions respectively, thereby forming two separate regions which make different the directions of electric fields as created in regions between the pixel electrodes and counter electrodes CT (called the multi-domain scheme).

In this case, it is possible to arrange so that the color tone or "hue" will no longer change even when observing from mutually opposite directions with respect to a direction perpendicular to the liquid crystal display section.

It should be noted that a counter electrode CT neighboring upon the drain signal line DL is formed so that its width is made greater than those of the other electrodes to ensure that an electric field from the drain signal line DL sufficiently terminates at this counter electrode CT, thus giving no affection to the pixel electrode PX side; simultaneously, a side edge on the drain signal line DL side is designed to have a straight or linear shape in order to narrow a region between it and the drain signal line DL.

A connection portion over the counter voltage signal line CL for connection of a plurality of (two in FIG. 3) pixel electrodes PX together is so formed as to be relatively larger in area in order to form a capacitive element Cstg between it and the counter voltage signal line CL.

This capacitive element Cstg is provided to long store or accumulate an image signal being supplied to the pixel electrode PX when the thin-film transistor TFT is driven to turn off.

And, a protective film PSV (see FIGS. 1 and 4) made for example of SiN is entirely formed on a surface of the pixel region thus arranged in this way.

This protective film PSV is provided for avoiding direct contact of the liquid crystal LC with the thin-film transistor TFT; in this embodiment, there is employed an arrangement in which any openings such as contact holes or the like are not provided at least within the liquid crystal display section AR (thus, within the pixel regions).

For example, although a structure for letting the pixel electrodes PX on or over this protective film PSV is also considered, this must require formation of contact holes for connection between this pixel electrode PX and thin-film transistor TFT in the protective film PSV; in the case employing such arrangement, inconvenience due to the presence of step-like surface configuration or alternatively inconvenience due to mask deviation due to photolithography techniques will take place. This is the reason.

And, a resin film RES (see FIGS. 1 and 4) is formed on an upper surface of this protective film PSV, which film is made for example of polyimide or siloxane or other similar suitable materials.

This resin film RES may be fabricated by a method which includes the steps of transferring by printing techniques a monomer solution of either polyimide or siloxane for example onto an overall region of the liquid crystal display section, and thereafter effectuating polymerization of the monomer at high temperatures ranging from 200° C. to 250° C.

Alternatively this resin film may also be fabricated by coating (spin coat) techniques other than the printing techniques. One example is that such film is fabricatable by a method including the steps of forming on the overall surface a monomer solution of resin such as polyimide, siloxane, acryl, cardo or else, and then performing fabrication at least over the entire region of the liquid crystal display section through exposure and development processes, and thereafter permitting polymerization of the monomer at high temperatures ranging from 200° C. to 250° C.

It is preferable that this resin film RES be set so that its thickness is less then or equal to 1,000 nm. This is because of the fact that it will be sufficient if it is possible to fully cover or coat scars or cracks or the like as occurred in the protective film PSV and also that good results are often obtainable when such film is not too thick in order to prevent reduction of the transmission amount of light rays.

Additionally it will be needless to say that the above-noted polyimide resin may be replaced with either one of the one having optical sensitivity and the one having no such light sensitivity. However, in cases where the one having the light sensitivity is employed, it is possible to co-use it as a mask for use during selective etching by photolithography techniques, which in turn makes it possible to perform hole definition of the terminal portion of each signal line (placed outside of the liquid crystal display section AR) in its underlying protective film PSV. Thereafter, it is possible to allow it to reside as the resin film RES without having to remove the mask.

In addition an orientation film ORI1 is formed on an upper surface of this resin film. This orientation film ORI1 is comprised of a film which determines the initial orientation or "alignment" directions of molecules of the liquid crystal LC in direct contact therewith, wherein rubbing processing was applied to the liquid crystal side surface of a resin film that has been formed by printing as an example.

Preferably this resin film is formed by printing in order to avoid generation of film thickness irregularities thereof, wherein the orientation film ORI1 that was formed by such printing techniques has its film thickness of about 50 to 100 nm.

Additionally the transparent substrate SUB2 is disposed over the transparent substrate SUB1 arranged in this way, with the liquid crystal LC interposed therebetween.

This transparent substrate SUB2 has its liquid crystal side surface on which a black matrix BM is formed in such a way as to partition each pixel region from other neighboring pixel regions. The use of this black matrix BM avoids irradiation of externally incoming light rays onto the thin-film transistor(s) TFT to thereby improve the contrast.

Color filters FIL of selected colors corresponding to the pixel regions are formed at openings in the pixel regions of the black matrix BM. These color filters FIL are such that the one of the same color is formed at each of the pixel regions as aligned in the y direction by way of example and also that color filters are recurrently formed with respect to each pixel array toward the x direction in the order of sequence of R (red), G (green) and B (blue) for example.

And a planarization film OC comprised for example of a resin film is formed to cover the black matrix BM and color filters FIL, with an orientation film ORI2 being formed on an upper surface of this planarization film OC.

Figure 5:
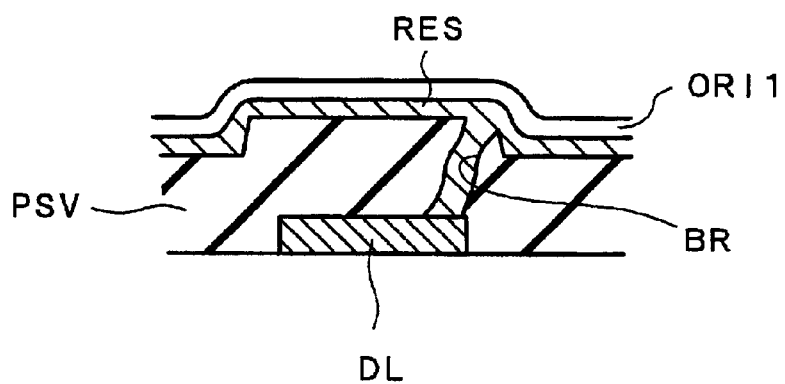
FIG. 5 is an explanation diagram showing effects of the instant invention.

As shown in FIG. 5 the liquid crystal display device arranged in the way stated above has an arrangement that even upon occurrence of scars and/or cracks or else (shown by BR in the drawing), such scars and/or cracks will be covered or coated by the resin film RES.

Due to this, it will no longer happen that signal lines or the like underlying the protective film are accidentally exposed to the liquid crystal side, resulting in an increase in local ion species density of the liquid crystal due to generation of electrochemical reaction, which in turn prevents reduction of liquid crystal support ratios.

From this, it becomes possible to suppress generation of stain-like display defects.

Embodiment 2

The embodiment stated supra does not specify the material at any one of the gate signal lines GL, drain signal lines DL and counter voltage signal lines CL. This is because any specific limitation should not be given thereto as far as those materials functioning as signal lines are employed.

However, from a view point of easiness of processing, there is a case where at least one signal line of the respective signal lines is made of aluminum (Al) or material containing Al therein; and, there is the one that is arranged to coat at its terminal section a transparent conductive film made for example of indium-tin-oxide (ITO) or indium-zinc-oxide (IZO) in order to avoid electrolytic corrosion or the like.

Figure 6:
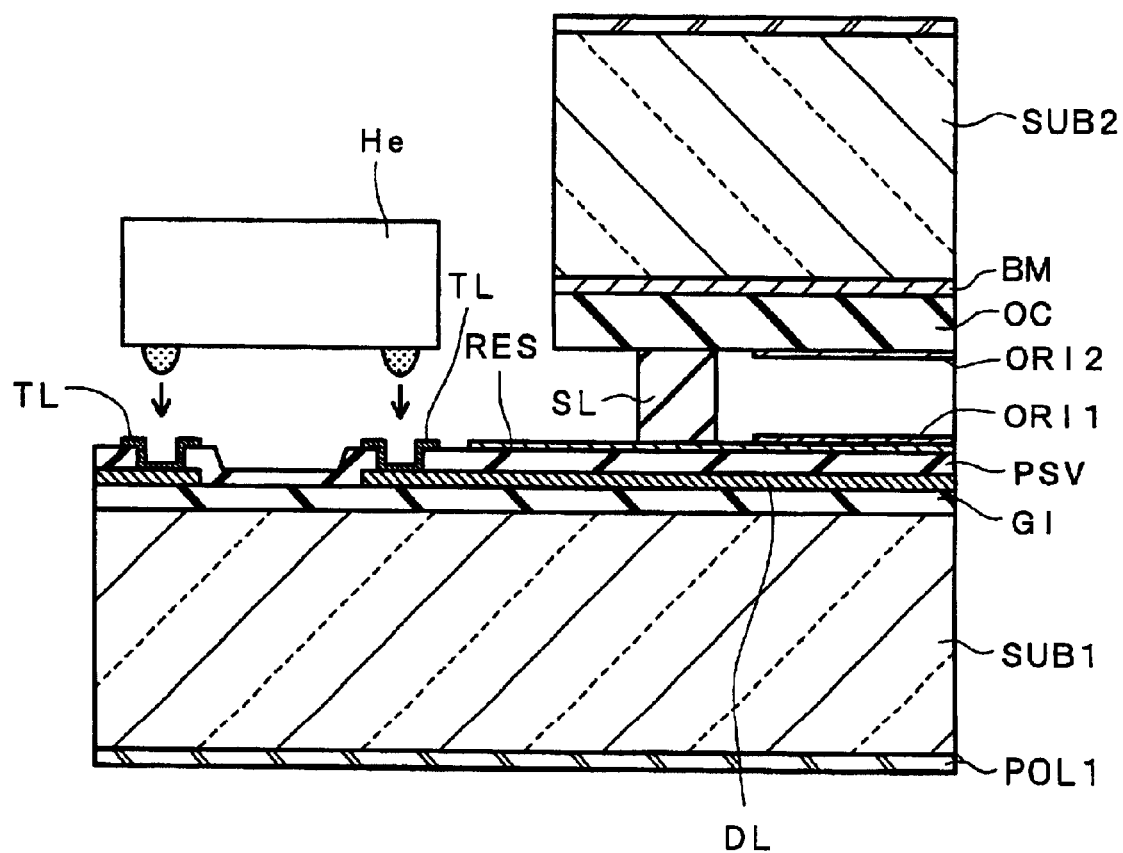
FIG. 6 is a main-part sectional diagram showing another embodiment of the liquid crystal display device in accordance with the invention.

FIG. 6 is a drawing showing a sectional view taken along line VI—VI of FIG. 2; for example, this is a drawing in which an image signal line DL for example is comprised of Al with a transparent conductive film TL made for example of ITO being formed at the terminal section thereof. In this case, although there has been inconvenience that the hydrogen bromide as contained in etching liquid for use during selective etching of the ITO film using photolithography techniques causes more than one image signal line DL as formed of Al to exhibit fusing or blowout through scars or cracks being presently formed in the protective film PSV, if the resin film RES is formed on the surface of the protective film PSV then it becomes possible to avoid such unwanted blowout of the image signal line DL.

Embodiment 3

In this embodiment, GL, DL and CL of the gate signal lines GL, drain signal lines DL, counter voltage signal lines CL, pixel electrodes PX and counter electrodes CT of the embodiment 1 were comprised of metallic ones. The metallic ones may alternatively be pure metals. To be brief, they are all the available materials that have known as being capable of application for liquid crystal devices including but not limited to Al, Cr, Mo, Ta, W and the like. Alloys are also employable. More precisely, such are AlTi, AlTiTa, CrMo, MoCr, AlNd, MoSi, MoW and other alloys. Obviously there may also be used a multilayer of pure metals, an alloy-laminated layer, metal/alloy lamination layer, etc. Obviously, a pure metal multilayer, alloy multilayer, metal/alloy multilayer may also be usable.

In this embodiment, with such an arrangement, it comes to have a specific structure in which any metallic material layer is not formed at an upper level over a resin film of a substrate with the resin film formed thereon in the display region that is an ensemble of pixel regions.

It was found out that the stain-like defects as stated in the embodiment 1 becomes more appreciable in case the material in contact with liquid crystals is low in stability. Accordingly it will be preferable to make use of certain metal materials with higher stabilities. Further note that it is preferable to use oxides rather than metals. This is such that a great number of materials known as the so-called transparent conductors such as indium-tin-oxide (ITO) and indium-tin-oxide (IZO) or the like are inherently oxides; in other words, risks of oxidation are further less than that in the case of metals. As a consequence, it was discovered that oxidation reaction will much hardly take place, which in turn makes it possible to more reliably prevent generation of stain-like defects.

Consequently, letting one or a plurality of ones of the gate signal lines GL, drain signal lines DL, counter voltage signal lines CL, pixel electrodes PX and counter electrodes CT be made of transparent conductive material(s) makes it possible to enhance the preventability of stain-like defects thus enabling prevention even upon occurrence of cracks in the protective film due to vibration shocks as externally applied thereto.

It must be noted that it is desirable that any electrodes made of conductive materials are not formed in the display region at the upper level over the resin film of the substrate with the resin film formed thereon as stated previously. In other words, all but the orientation film are not formed in the display region at the upper layer than the resin film of the substrate with the resin film formed thereon.

A principle of the method for preventing stain-like defects lies in prevention of contact between the liquid crystal and the conductive material used. Accordingly, a liquid crystal display device will be effective, which comprises, in a liquid crystal side pixel region of one substrate of respective substrates as disposed to oppose each other with a layer of liquid crystal material interposed therebetween, a gate signal line made of a metal, a drain signal line made of a metal being formed over the metallic gate signal line with a dielectric film sandwiched therebetween, a thin-film transistor as driven by a scan signal from the metallic gate signal line, a pixel electrode to which an image signal from the metallic drain signal line is supplied via this thin-film transistor; a protective film formed to also cover the thin-film transistor and the metallic drain electrode plus the pixel electrode; and a resin film formed on or over an upper surface of this protective film, wherein a counter electrode for generation of an electric field between it and the pixel electrode and a counter voltage signal line made of a metal for supplying a counter voltage thereto are formed on the one substrate side with the metallic counter voltage signal line being formed at the same layer as the scan signal line, and at least in a display region being an ensemble of the pixel regions, at least three layers of the protective film and resin film plus orientation film are arranged to separate all metal layers from a liquid crystal layer to thereby prevent contact between liquid crystals and metallic material(s).

As apparent from the foregoing explanation, in accordance with the liquid crystal display device embodying the present invention, it is possible to prevent generation of stain-like display defects.

What is claimed is:

1. A liquid crystal display device comprising, in a liquid crystal side pixel region of one substrate of respective substrate as disposed to oppose each other with a layer of liquid crystal material interposed therebetween, a gate signal line made of a metal, a drain signal line made of a metal being formed over the metallic gate signal line with a dielectric film sandwiched therebetween, a thin-film transistor as driven by a scan signal from said metallic gate signal line, a pixel electrode to which an image signal from said metallic dram signal line is supplied via this thin-film transistor; a protective film formed to also cover said thin-film transistor, said metallic drain electrode and said pixel electrode; and a resin film formed on or over an upper surface of this protective film, wherein a counter electrode for generation of an electric field between it and said pixel electrode and a counter voltage signal line made of a metal for supplying a counter voltage thereto are formed on the one substrate side with the metallic counter voltage signal line being formed at the same level as the scan signal line, and at least in a display region being an ensemble of said pixel regions, at least three layers of said protective film, resin film and an orientation film are arranged to separate all metal layers from a liquid crystal layer to thereby preyent contact between liquid crystals and metallic materials(s).

2. A liquid crystal display device according to claim 1, wherein the protective film is made of SiN.

3. A liquid crystal display device according to claim 1, wherein the resin film is thinner than the protective film.

4. A liquid crystal display device according to claim 2, wherein the resin film is thinner than the protective film.

* * * * *